(12) United States Patent
Newton et al.

(10) Patent No.: US 10,564,322 B2
(45) Date of Patent: Feb. 18, 2020

(54) DIFFRACTIVE ANTIGLARE IN A MULTI-LAYERED DISPLAY

(71) Applicant: PURE DEPTH LIMITED, Auckland (NZ)

(72) Inventors: John D. Newton, Auckland (NZ); Gareth P. Bell, Auckland (NZ); James S. Emslie, Auckland (NZ)

(73) Assignee: PURE DEPTH LIMITED (NZ)

( * ) Notice: Subject to any disclaimer, the term of this patent is extended or adjusted under 35 U.S.C. 154(b) by 129 days.

(21) Appl. No.: 15/498,730

(22) Filed: Apr. 27, 2017

(65) Prior Publication Data

US 2018/0313977 A1 Nov. 1, 2018

(51) Int. Cl.
| | |
|---|---|
| *G02B 1/11* | (2015.01) |
| *G02B 5/18* | (2006.01) |
| *G02F 1/1335* | (2006.01) |
| *G02F 1/1347* | (2006.01) |

(52) U.S. Cl.
CPC .............. *G02B 1/11* (2013.01); *G02B 5/1861* (2013.01); *G02F 1/1347* (2013.01); *G02F 1/133502* (2013.01); *G02B 2005/1804* (2013.01); *G02F 2201/305* (2013.01); *G02F 2201/38* (2013.01)

(58) Field of Classification Search
CPC .............................. G02B 1/11; G02B 5/1861; G02B 2005/1804; G02B 5/0215; G02B 5/0252; G02B 27/0101; G02F 1/133502; G02F 2201/38; G02F 2201/305; G02F 1/0063; H01L 27/3267; H01L 27/3286
See application file for complete search history.

(56) References Cited

U.S. PATENT DOCUMENTS

| | | | |
|---|---|---|---|
| 6,067,137 A | 5/2000 | Ohnishi et al. | |
| 7,724,208 B1 | 5/2010 | Engel et al. | |
| 7,730,413 B1 | 6/2010 | Engel et al. | |
| 7,903,318 B2 | 3/2011 | Moidu et al. | |
| 8,146,277 B2 | 4/2012 | Engel | |
| 8,619,363 B1 | 12/2013 | Coleman | |
| 8,832,574 B2 | 9/2014 | Ostergard et al. | |
| 8,866,812 B2 | 10/2014 | Han et al. | |
| 2003/0222857 A1 | 12/2003 | Abileah | |
| 2008/0284792 A1* | 11/2008 | Bell | G09G 5/00 345/589 |
| 2010/0045601 A1* | 2/2010 | Engel | G02B 27/2228 345/161 |
| 2010/0134733 A1* | 6/2010 | Watanabe | B29D 11/00798 349/112 |
| 2012/0300304 A1* | 11/2012 | Gollier | C03C 15/00 359/599 |
| 2013/0316814 A1 | 11/2013 | Griswold et al. | |

(Continued)

OTHER PUBLICATIONS

U.S. Appl. No. 15/359,732, filed Nov. 23, 2016; Prema et al.

*Primary Examiner* — Kimberly N. Kakalec
(74) *Attorney, Agent, or Firm* — Craig A. Baldwin

(57) ABSTRACT

A multi-layered display including an upper display screen, and a lower display screen arranged so as to at least partially overlap with the upper display screen is described. An antiglare layer is disposed on the upper display screen. The antiglare layer includes a diffraction pattern configured to blur ambient reflections without substantially affecting transmitted light. The diffraction pattern may have a quarter wavelength thickness. Method for forming the multi-layered display is also provided.

17 Claims, 19 Drawing Sheets

(56) References Cited

U.S. PATENT DOCUMENTS

| | | | |
|---|---|---|---|
| 2014/0049822 A1* | 2/2014 | Gollier | G02B 5/0236 359/488.01 |
| 2014/0118830 A1* | 5/2014 | Mueller | G02B 5/1814 359/572 |
| 2015/0310798 A1 | 10/2015 | Heide et al. | |
| 2017/0075127 A1 | 3/2017 | Borrelli et al. | |
| 2017/0090210 A1 | 3/2017 | Bell | |

* cited by examiner

| Pattern | Gloss 20 | Gloss 60 | Haze (%) |
|---|---|---|---|
| | 11 | 64 | 53 |
| | 5.9 | 58 | 52 |
| | 6.3 | 59 | 53 |

Fig. 11

DIFFRACTIVE ANTIGLARE IN A MULTI-LAYERED DISPLAY

BACKGROUND

This disclosure relates generally to displays and, more particularly, to display systems and methods for displaying images on multi-layered displays.

An important quality criteria of any display is the readability of displayed content. Readability is essential for the optimum performance of any display, and it is generally desired that the displayed content is read clearly, quickly and comfortably without eye strain. Glare, if not properly addressed, can be a significant detrimental factor in any display. Glare, as used herein, is the difficulty seeing in the presence of external bright light such as direct or reflected natural (e.g., sunlight) or artificial (e.g., halogen lamp) light. Antiglare (AG) coatings are often applied to displays in order to reduce glare, and to thereby provide a better view of the images displayed.

Many antiglare techniques use diffusion to breakup externally generated light that reflects off the display surface. Diffusion reduces the coherence of the reflected image, thereby making the reflected image unfocused so that its interference with the image intended for viewing is reduced.

Multi-layered displays have also been developed to display objects with a realistic perception of depth. Multi-layered display (MLD) systems are becoming popular for several applications such as for vehicle dashboards, handheld devices and the like. Multi-layered display systems can be configured to display images of scenes so that depth can be represented by distributing objects to be displayed on to the separate display panels of the multi-layered display. Example multi-layered display systems are described in U.S. patent application Ser. No. 15/359,732 filed on Nov. 23, 2016, the contents of which is incorporated herein in its entirety. Similar to many other types of displays, multi-layered displays too can suffer from glare-induced reduction in readability.

The use of multi-layered display systems in applications such as vehicular dashboards, which may often be viewed by a driver in direct sunlight or other light, may have issues associated with glare. Since readability of the display is even more important in such applications, it is highly desired that improved antiglare solutions are implemented for multi-layered displays.

SUMMARY

Exemplary embodiments provide a display system using a multi-layered display including two or more display screens (e.g., LCDs) and/or layers provided in a stacked arrangement.

In an example embodiment, a multi-layered display having an upper display screen, and a lower display screen arranged so as to at least partially overlap with the upper display screen is provided. An antiglare layer is disposed on the upper display screen. The antiglare layer includes a diffraction pattern configured to blur ambient reflections without substantially affecting transmitted light. The diffraction pattern may have a quarter wavelength thickness.

In another example embodiment, a method is provided for displaying three-dimensional images in a multi-layered display system comprising a plurality of display screens including at least a first display screen and a second display screen arranged in a substantially parallel and overlapping manner.

A method of forming a multi-layered display is provided. The method includes providing an upper display screen, and providing a lower display screen arranged so as to at least partially overlap with the upper display screen. The method also includes disposing an antiglare layer on the upper display screen, the antiglare layer having a diffraction pattern configured to blur ambient reflections without substantially affecting transmitted light. The diffraction pattern may have a quarter wavelength thickness.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 11 illustrates some diffraction patterns that can be used in example embodiments, and the associated gloss and haze performance.

DETAILED DESCRIPTION

Figure 1:
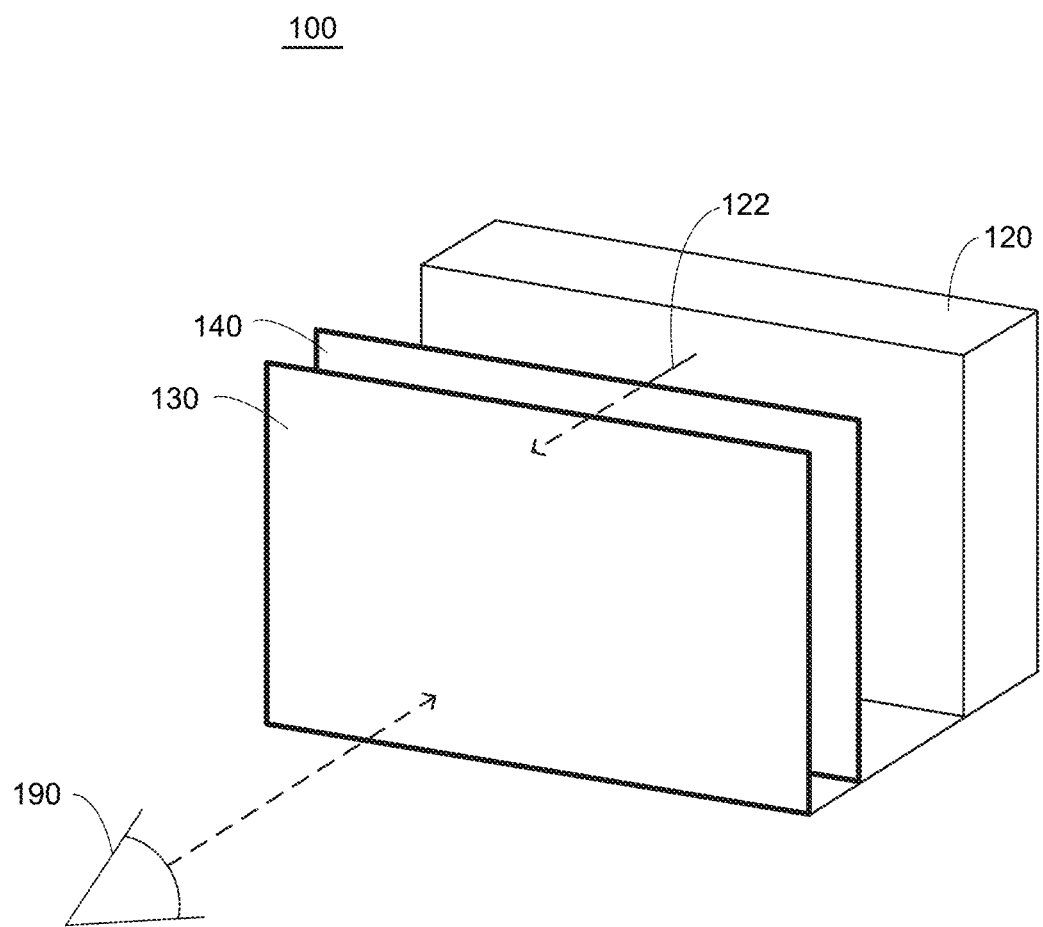
FIG. 1 schematically illustrates a multi-layered display system according to some example embodiments of the present disclosure.

Multi-layered display systems include multiple separate display screens (also referred to as display layers or display panels). As described in the above incorporated patent application, a composite image of a scene may be viewed by an observer on a multi-layered display system. The composite image is the visual appearance to the observer of separate images of various portions of the scene displayed on respective display screens of the multi-layered display system. Multi-layered displays may provide a depth effect to the observer by careful content creation across two or more stacked display screens. These displays are currently useful in the dashboard centre stack and/or instrument cluster of a vehicle where they can provide realistic or near-realistic 3D representations of dials, gauges, sliders, menus, switches etc. However, the multi-layered displays described in this disclosure are not limited to the above applications.

The multi-layered displays, in many uses, are susceptible to being viewed in direct sunlight and/or other forms of strong light. For example, when being used in the dashboard of a vehicle, the display must continue to be clearly, quickly and easily readable to the viewer in direct sunlight while the vehicle is in operation. Glare can be caused by many forms of light incident upon the multi-layered display, including when a multi-layered display is being used in the dashboard of a vehicle. Example embodiments of the present disclosure provide effective antiglare systems and methods for use with multi-layered display systems to improve the clarity of the displayed image.

Standard antiglare coatings or films that are placed on LCD panels and the like provide an antiglare surface layer. The purpose of this layer is to spread bright specular reflections so that they do not obscure display visibility (e.g., visibility of the image intended for display) or distract from the task at hand. This antiglare layer can consist of either a roughened surface or micro beads of a contrasting refractive index embedded in a polymer. In a multi-layered display configuration the conventional antiglare film configurations typically blur the one or more backscreens by redirecting rays which appear to come from distant pixels. These conventional antiglare film can also adversely cause blur or sparkle in a single layered system. In embodiments of the present invention, a display coated with an antiglare film operates to provide the upside of antiglare (e.g., spread bright specular reflections so that they do not obscure display visibility) while eliminating or minimizing the downside of blur to imaging layers behind (e.g., blurring of the one or more backscreens by redirecting rays coming from the backscreens) the top layer.

Example embodiments coat the display with a quarter-wavelength (i.e., ¼ wavelength) thick diffraction pattern that blurs ambient reflections since reflected light will undergo two passes through the coating, but does not affect (or only insignificantly affects) transmitted light that come, for example, from a backscreen of a multi-layered display.

FIG. 1 illustrates a multi-layered display system 100 according to some example embodiments of the present disclosure. The display system 100 may include a light source 120 (e.g., rear mounted light source, side mounted light source, optionally with a light guide), and two or more display screens 130-140. The display screens 130-140 may be disposed substantially parallel or parallel to each other and/or a surface (e.g., light guide) of the light source 120 in an overlapping manner. In one embodiment, the light source 120 and the display screens 130-140 may be disposed in a common housing. It will be understood that, in some example embodiments, multi-layered display 100 may include only two display screens, and may or may not include a light source 120 (e.g., a light source may be external to the housing of the multi-layered display system). The multi-layered display 100 may be provided at the dash of a vehicle in some example embodiments of this disclosure, in order to show the viewer (observer) images such as a speedometer, gauges such as oil pressure or fuel level gauges, navigation, etc. It should be appreciated that the elements illustrated in the figures are not drawn to scale, and thus, may comprise different shapes, sizes, etc. in other embodiments. It should also be appreciated that vehicular dashboards are only one application for multi-layered display systems herein described, and that the use of multi-layered display systems as displays for portable devices, advertising displays, etc. are contemplated in various embodiments.

The front display screen 130 which is nearest the observer 190 is coated, on the surface facing the observer 190, with an antiglare coating having a quarter-wavelength thick diffraction pattern. The diffraction pattern used in the example embodiments blurs ambient reflections since reflected light will undergo two passes, but does not affect (or only insignificantly affects) transmitted light.

In an example application of displaying a three dimensional 3D effect using a multi-layered display system, the multi-layered display system 100 may display graphical information to a viewer/observer 190, such as an operator or passenger of a vehicle, by displaying information including a gradient on two of the display screens 130-140 simultaneously. To mimic depth cues of the displayed object, portions of the same object can be displayed with different gradients of a given color or the like on different display screens 130-140. For example, each of the display screen 130-140 may be controlled to display a different portion of a gauge and/or needle found in a traditional vehicle instrument panel. In certain embodiments, each of the display screen 130-140 may be controlled to display a different portion of an image (e.g., clock, gauge and/or needle(s)) of a watch device to be worn in the wrist of a user, or the like.

The light source 120 may be configured to provide illumination for the display system 100. The light source 120 may provide substantially collimated light 122 that is transmitted through the display screens 130-140. Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

In some example embodiments, the display screens are stacked LCD layers within a single pair of cross polarizers on the external facing surfaces if the panels are LCD or just stacked with transparent LED or OLED technologies. The rear most display layer may be a non-transparent technology. The LCD layers may be twisted nematic film in vertically aligned, patterned vertical alignment, or in plane switching modes, transparent OLED (TOLED), and/or transparent direct view micro LED displays. In certain example embodiments, the LCD displays are used in normally black mode, which is they have no effect on incident polarized light should the pixel not have voltage applied across it. In some embodiments, TOLED or micro LED displays may be used in the off state, which is not emitting light. In one example embodiment, the display panels 130-140 may be combinations of either full color RGB, RGBW or monochrome panels. The display screens 130-140 are not limited to the listed display technologies and may include other display technologies that allow for the projection of light. In one embodiment, the light may be provided by a projection type system including a light source and one or more lenses and/or a transmissive or reflective LCD matrix.

In one embodiment, each of the display screens 130-140 may be approximately the same size and have a planar surface that is parallel or substantially parallel to one another. In another embodiment, one or more of the display screens 130-140 may have a curved surface. In one embodiment, one or more of the display screens 130-140 may be displaced from the other display screens such that a portion of the display screen is not overlapped and/or is not overlapping another display screen.

Each of the display screens 130-140 may be displaced an equal distance from each other in example embodiments. In another embodiment, the display screens 130-140 may be provided at different distances from each other. For example, a second display screen 140 may be displaced from the first display screen 130 a first distance, and a third display screen (not shown) may be displaced from the second display screen 140 a second distance that is greater than the first distance. The fourth display screen (not shown) may be displaced from the third display screen a third distance that is equal to the first distance, equal to the second distance, or different from the first and second distances.

The display screens 130-140 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-140. The distances between the display screens 130-140 may be set to obtain a desired depth perception between features displayed on the display screens 130-140.

In one embodiment, a position of one or more of the display screens 130-140 may be adjustable by an observer 190 in response to an input. Thus, an observer 190 may be able to adjust the three dimension depth of the displayed objects due to the displacement of the display screens 130-140. A processing system may be configured to adjust the displayed graphics and gradients associated with the graphics in accordance with the adjustment.

Each of the display screens 130-140 may be configured to receive data and display, based on the data, a different image on each of the display screens 130-140 simultaneously. Because the images are separated by a physical separation due to the separation of the display screens 130-140, each image may be provided at a different focal plane and depth is perceived by the observer 190 in the displayed images. The images may include graphics in different portions of the respective display screen.

Figure 2A:
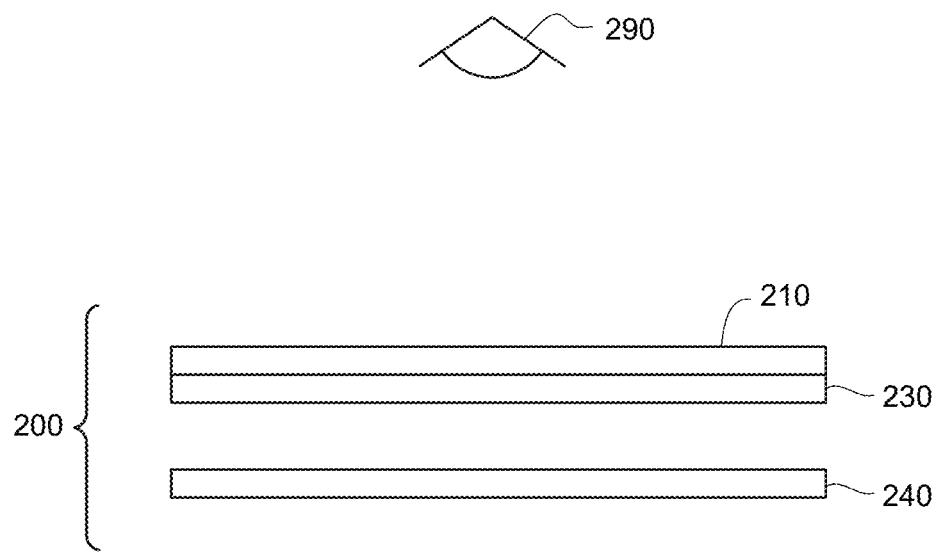
FIG. 2A illustrates a schematic view including the antiglare coating of a multi-layered display according to some example embodiments.

FIG. 2A illustrates a schematic view of a multi-layered display 200 according to some example embodiments. The multi-layered display 200 includes a front display screen 230 coated on the surface facing observer 290 with an antiglare coating 210, and a back display screen 240. In example embodiments, the antiglare coating 210 can be embossed directly into the surface of the polarizer or plastic cover, UV-embossed onto the surface of the front polarizer or glass cover, or etched into a glass cover with hydrofluoric acid. The multi-layer display 200 may be similar to the multi-layered display 100 described above. Although not specifically shown in FIG. 2, multi-layered display 200 may include a light source to illuminate one or more of the display screens, and/or processors and circuitry associated with displaying images in the multi-layered display. It will also be understood that the multi-layered display is not limited to only two display screens.

Figure 2B:
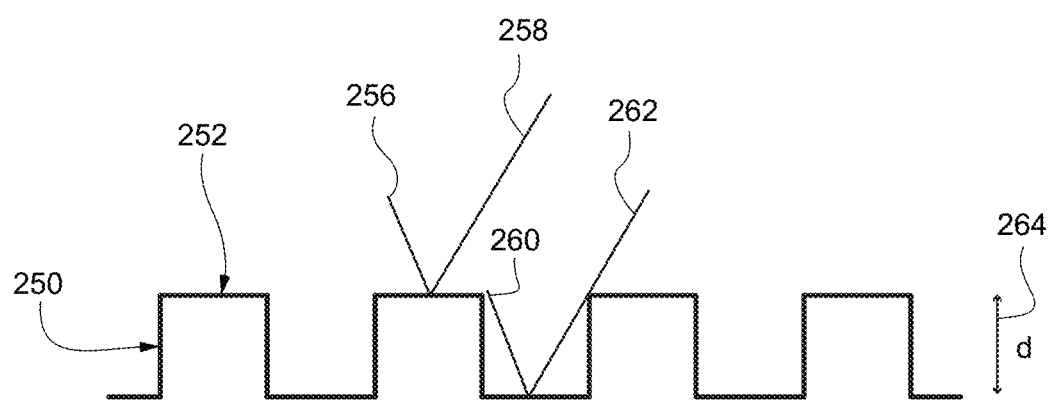
FIG. 2B illustrates a schematic side perspective of a grating that includes a diffraction pattern that may be provided in the antiglare coating applied to a multi-layered display in accordance with some example embodiments.

FIG. 2B provides a schematic side perspective of a grating 250 that includes a diffraction pattern that may be provided in the antiglare coating 210 applied to the multi-layered display 200 in accordance with some example embodiments. FIG. 2B graphically illustrates the relationship between the depth 264 $d$, the top surface 252 of the grating and the bottom surface 254 of the grating, and incident light rays (e.g., 256 and 260).

As can be observed in FIG. 2B, half of the light impinging on the display surface will contact the top surface 252 of the grating 250 and is reflected. For example, the incident ray 256 is reflected 258 upon contacting the top surface 252. The other half contacts the bottom surface 254 of the grating 150 and is reflected. For example, incident ray 260 is reflected 262 upon contacting the bottom surface 254. If the path difference between the light reflected from the top half of the grating and the bottom half of the grating is half a wavelength then reflected light will undergo diffraction. That is, for example, if the path difference between rays 258 and 262 is a half wavelength, then the reflected light will diffract. Therefore, in order to ensure diffraction of the reflected light, since the light reflected from the bottom surface of the grating travels twice the distance of the grating depth, the grating depth in example embodiments is configured to be one quarter of the wavelength. With this configuration of the grating depth, the reflected light is diffracted. However, the transmitted light, because it makes only a single pass through the antiglare coating, is subjected to only a very small path difference and only has a small phase delay due to the refractive index of the material of the antiglare coating. That is, the backscreen image(s) provided by transmission through the screens of the multi-layer display and antiglare coating is subjected to little or no path difference and phase delay and maintains substantially the same path, and as such, the blur of the backscreen image(s) is minimized.

The antiglare reflection component depth is fixed in embodiments since the embodiments work in reflection mode, i.e., the light reflects off the bottom step and top step in air and is independent of refractive index. This fixed the step depth at about lambda/4. The embodiments preferably have the depth centered on green light at approximate bounds of [125, 140] nm of depth. The percentage of light coming from behind the display that is deviated depends on the grating efficiency, and is desirably low because, for standard transparent dielectric materials of n=approximately 1.45-1.6 the path difference is between 11%-15% for green light whereas for efficient transmission grating a path difference of about 50% is needed.

In order to achieve the above described diffraction of the reflected image and minimizing the blurring of the backscreen image(s), some example embodiments may be configured in accordance with certain selected design considerations. Example design considerations for antiglare coatings in embodiments may include, but are not limited to, a Rockwell Hardness Substrate of M-94 or better (as per acrylic) for the antiglare coating, a reflection scattering (antiglare) full width half maximum (FWHM) of 6 degrees or better, a minimized transmission scattering (e.g., rear screen blur, and a wavelength dependence centered on or about 530 nm.

The maximizing of the antiglare reflection component of the antiglare coating is illustrated in FIG. 2 (FIGS. 2A and 2B). As illustrated in FIG. 2, the light reflected off the top surface of the grating is subjected to no path length change (e.g., rays 256 and 258 is subjected to a path length change of 0), and the light reflected off the bottom surface of the grating is subjected to a path length of twice the depth (assuming small (e.g., plus/minus 10 degrees) angle of incidence) (e.g., rays 260 and 262 is subjected to a path length change of 2d, where d is the depth or height of the antiglare coating). Constructive interference is generated when $2d=\lambda/2$, where $\lambda$ is the wavelength of the incident light. Therefore, with a depth $d=\lambda/4$, the grating efficiency is at near unity. In example embodiments, whereas humans are most sensitive to green light with a wavelength of ~532 nm, $d=\lambda/4=532$ nm/4=133 nm or 0.133 um.

Figures 9A, 9B:
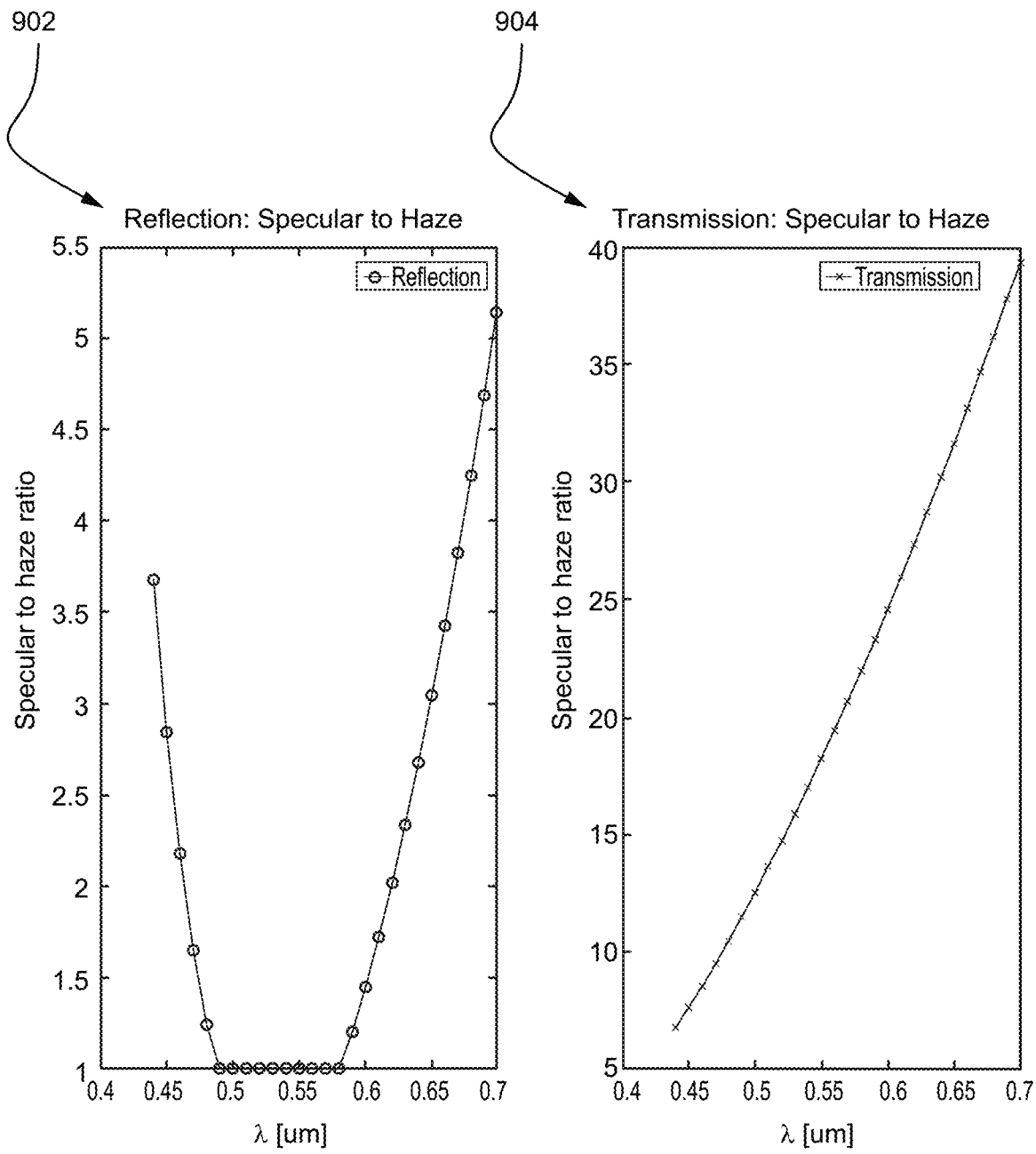
FIG. 9A and FIG. 9B (collectively referred to as FIG. 9) illustrate the ratio of specular portion to the haze portion for visible wavelengths.
Figure 10A:
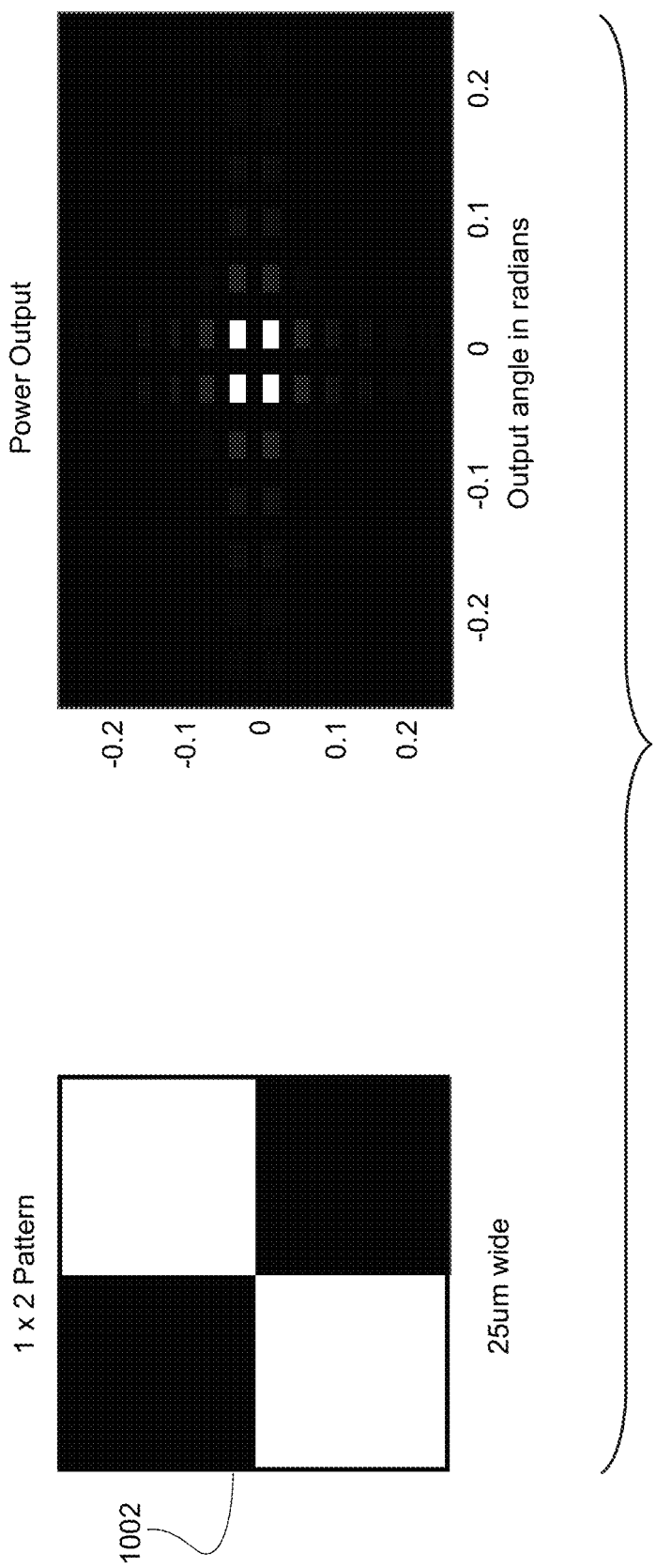
FIG. 10A, FIG. 10B, FIG. 10C, FIG. 10D, FIG. 10E, FIG. 10F and FIG. 10G (collectively referred to as FIG. 10) illustrate some Dammann patterns that may be used as diffraction patterns in certain example embodiments.
Figure 10B:
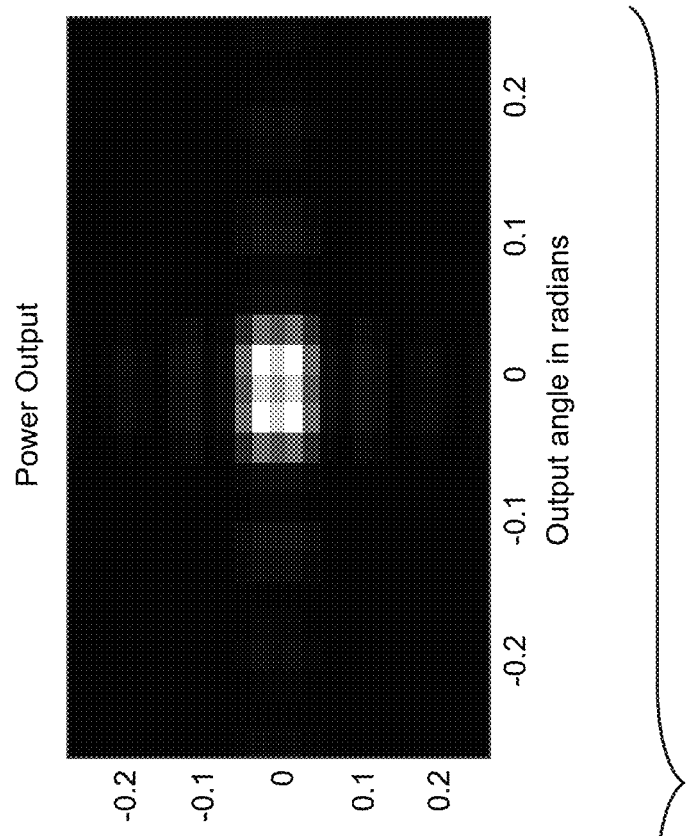
Figure 10B:
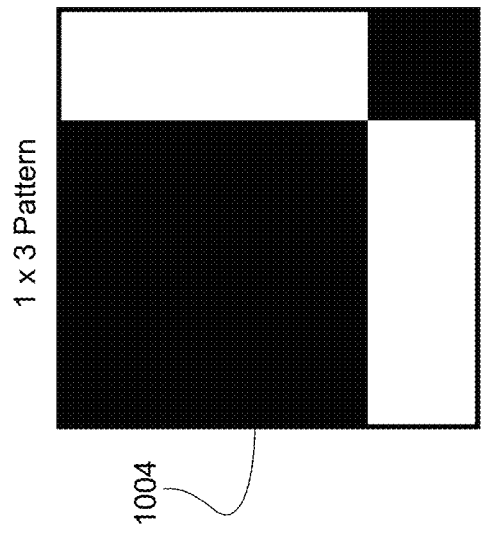
Figure 10C:
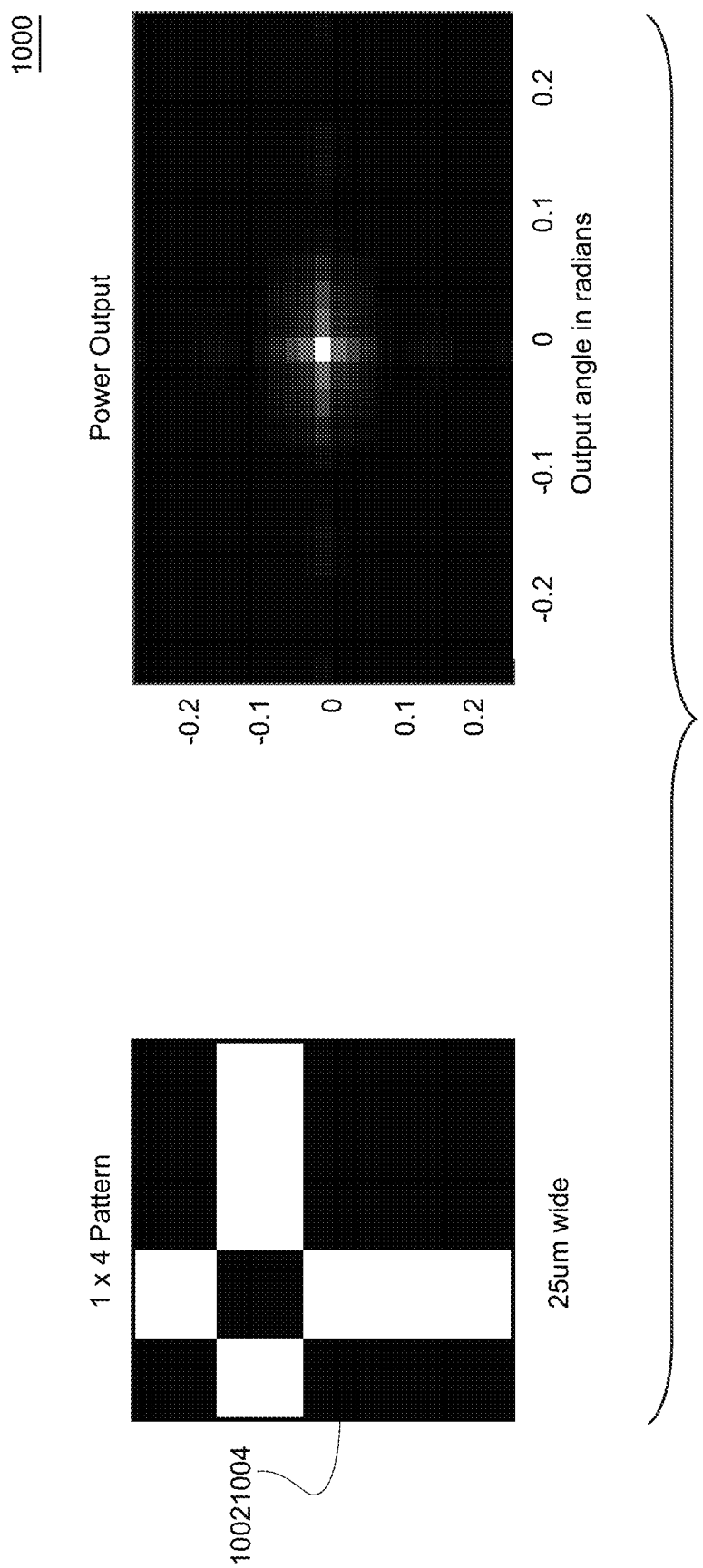
Figure 10D:
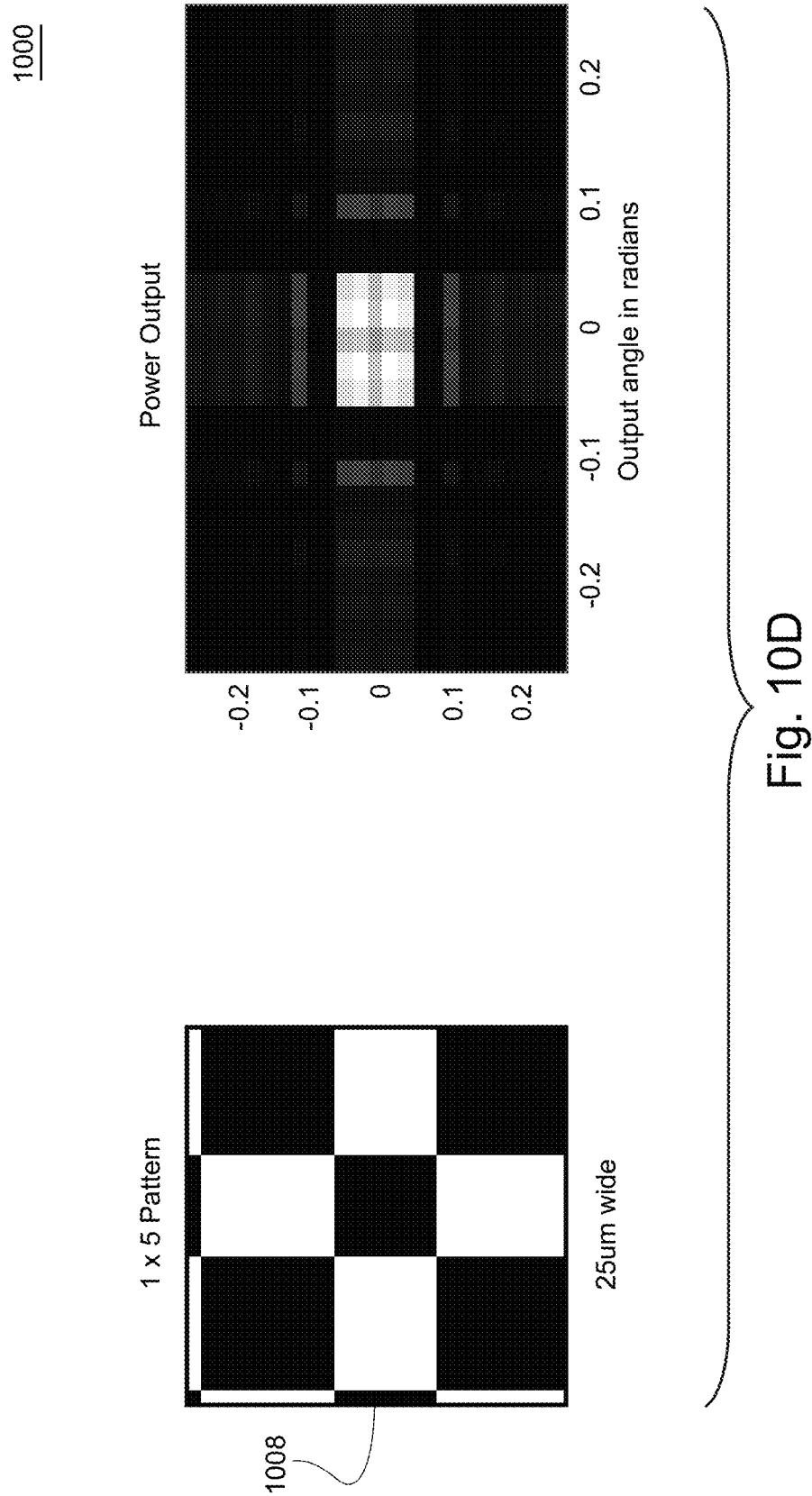
Figure 10E:
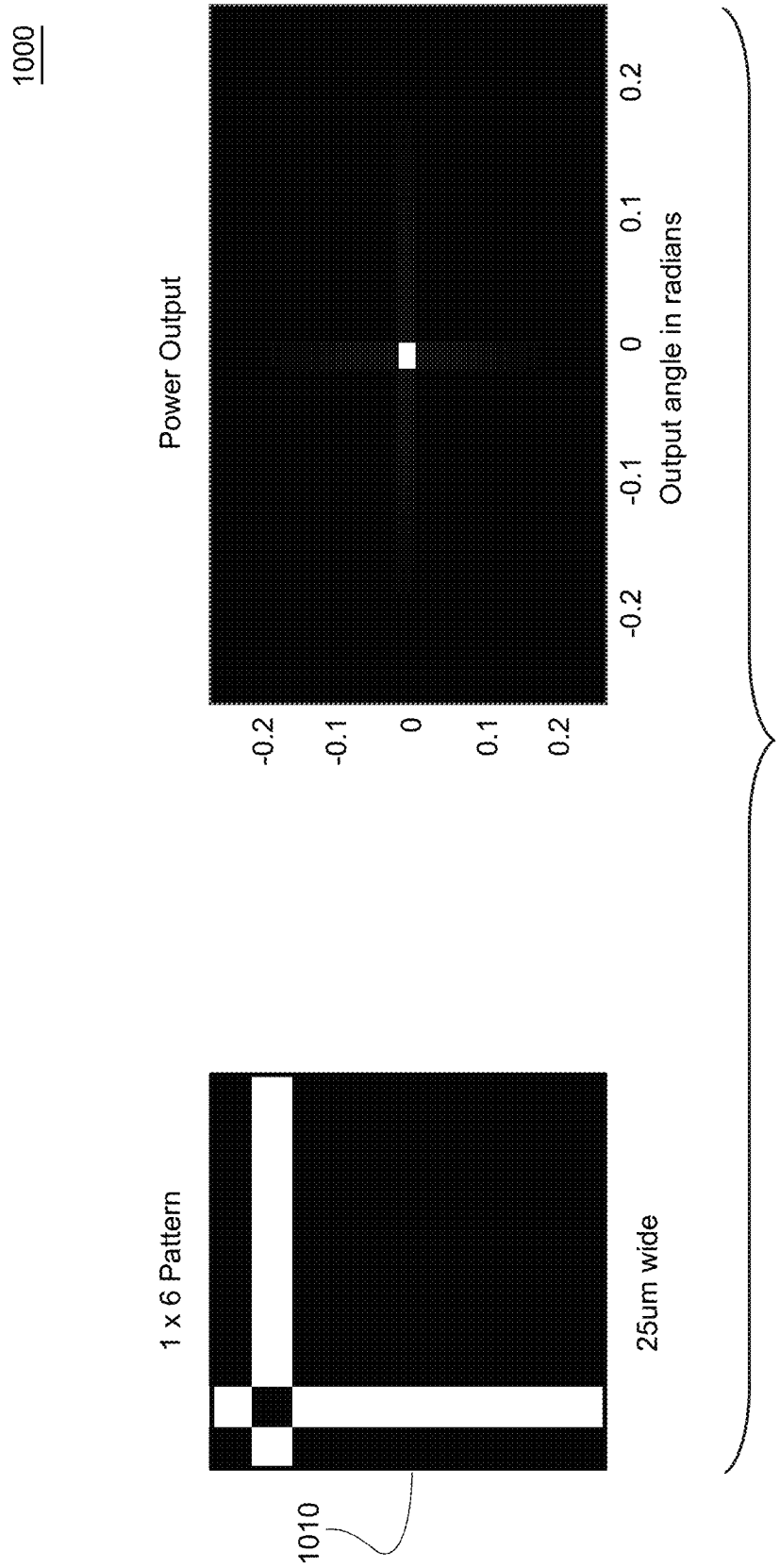
Figure 10F:
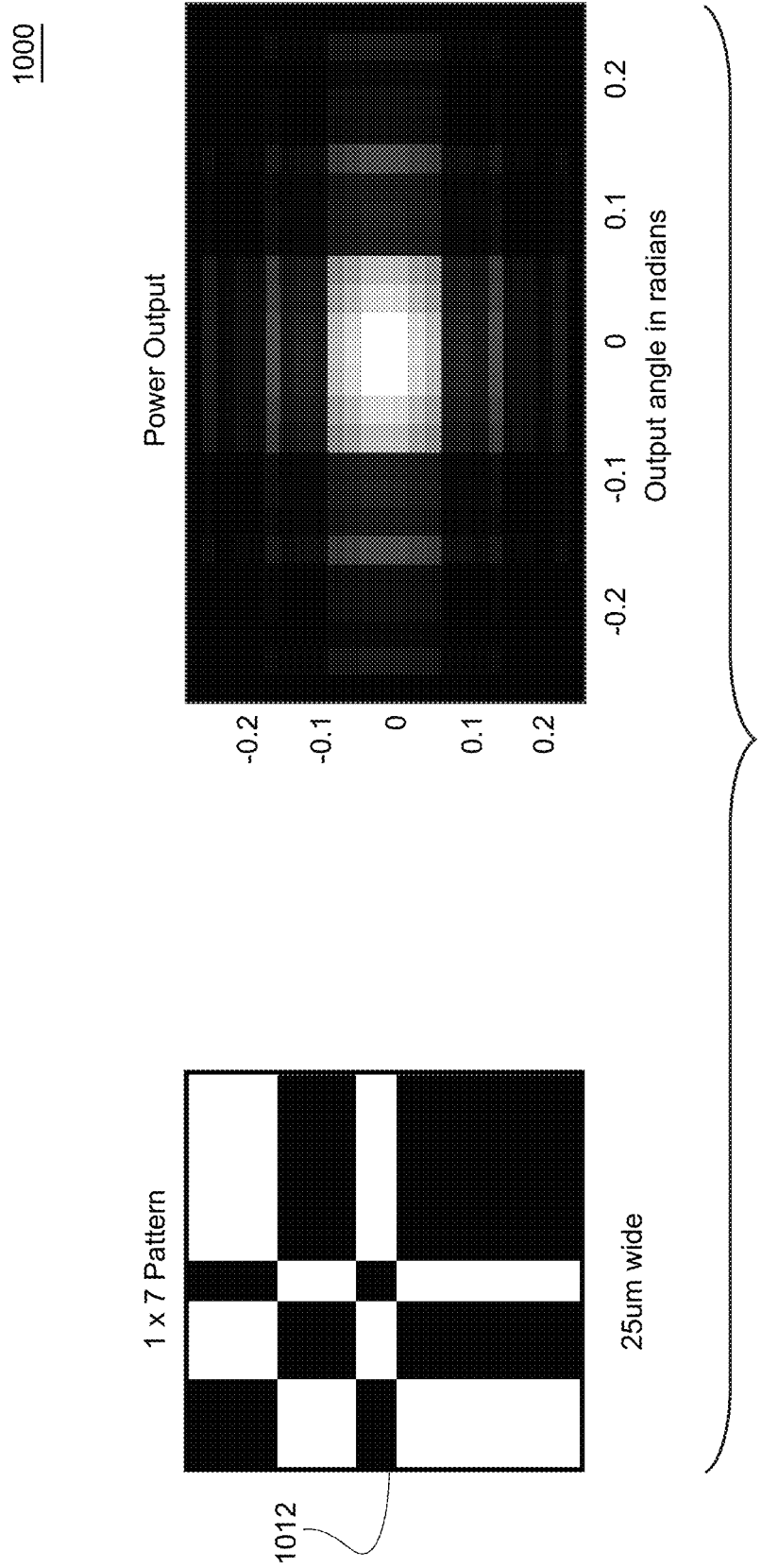
Figure 10G:
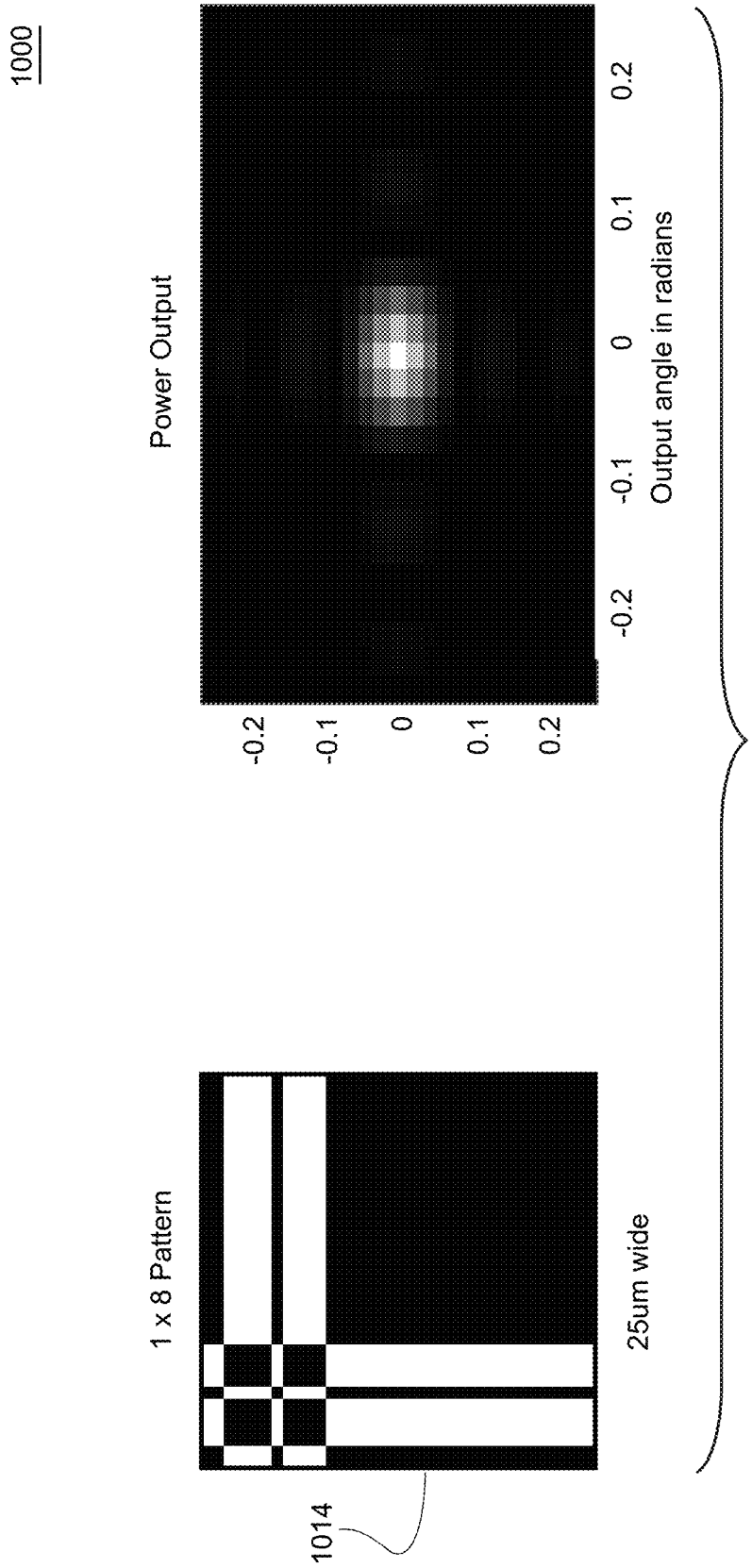

The minimizing of the backscreen transmission component may also be observed in relation to FIG. 2. The path length change for the backscreen transmitted light may be characterized as $(\Delta n)d$, where $\Delta n$ is the difference between the refractive index of the material (e.g., approximately 1.5 for glass) and air (e.g., 1.0). This value is small for transmission at approximately $\lambda/8$, and results in low grating efficiency. Consequently, the antiglare coating made in accordance with the above considerations for maximizing of the antiglare reflection component and minimizing of the backscreen transmission component imposes only a minimal effect, or imposes no effect, on the backscreen image. For example, FIG. 9B below illustrates a minimum value of approximately 10:1 for blue light at 0.45 nm, where any lower would likely cause significant blur.

Figure 3:
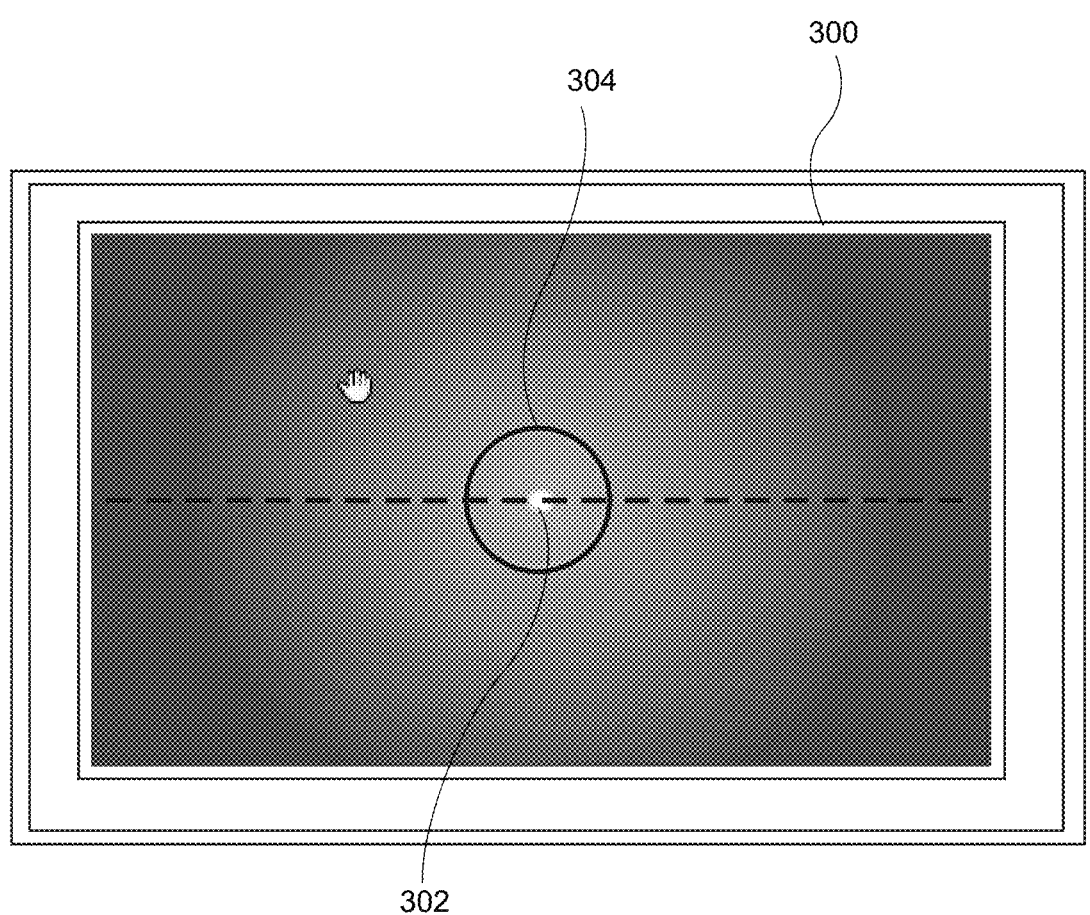
FIG. 3 illustrates a display with diffuse and specular reflection properties.

FIG. 3 is an illustration is a display 300 that has diffuse and specular reflection properties. The center bright spot 302 is the virtual image of a small source viewed in the specular direction. The fuzzy gray circular area around the bright spot 302 is the diffuse haze component 306 and the background gray is the diffuse Lambertian component 308. A typical luminance measurement in the specular direction would subtend a measurement field area that is centered about the bright white spot 302 and is represented by the circle 304 illustrates an example captured from a conventional commercially available antiglare display.

In the conventional antiglare structure of FIG. 3, an observer will see a bright, blurry circle with an intense white dot in the center when illuminated by a point source such as a bright LED. Effective antiglare according to example embodiments would minimize the intensity of the white dot 302 by spreading the reflected light into the blurry circle region. The white dot region is called the specular reflection and the blurry circle is referred to as the haze. These two components (e.g., the ratio of specular reflection to diffuse reflection) provide a way to quantify the antiglare. The so called gloss (e.g., the ratio of specular reflection to diffuse reflection) is proportional to the relative intensity of the bright spot with respect to the blurry circle, typically specified at a measurement angle. The so called haze is inversely proportional to the gloss. For example a high gloss number would mean a bright central spot with little of the blurry circle, and a high haze number would mean the blurry circle was brighter with respect to the bright spot. Line spread functions are typically used to quantify the width of the blurry circle.

Figure 4A:
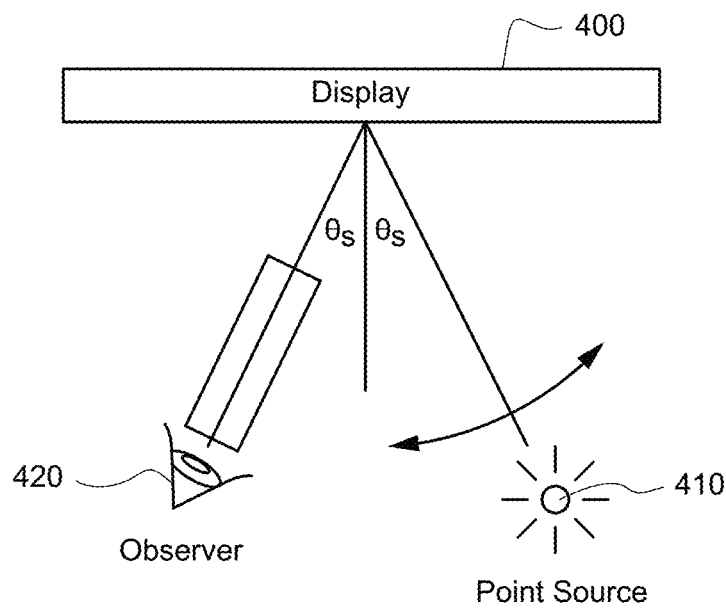
FIG. 4A and FIG. 4B (collectively referred to as FIG. 4) illustrate a light measurement
Figure 4B:
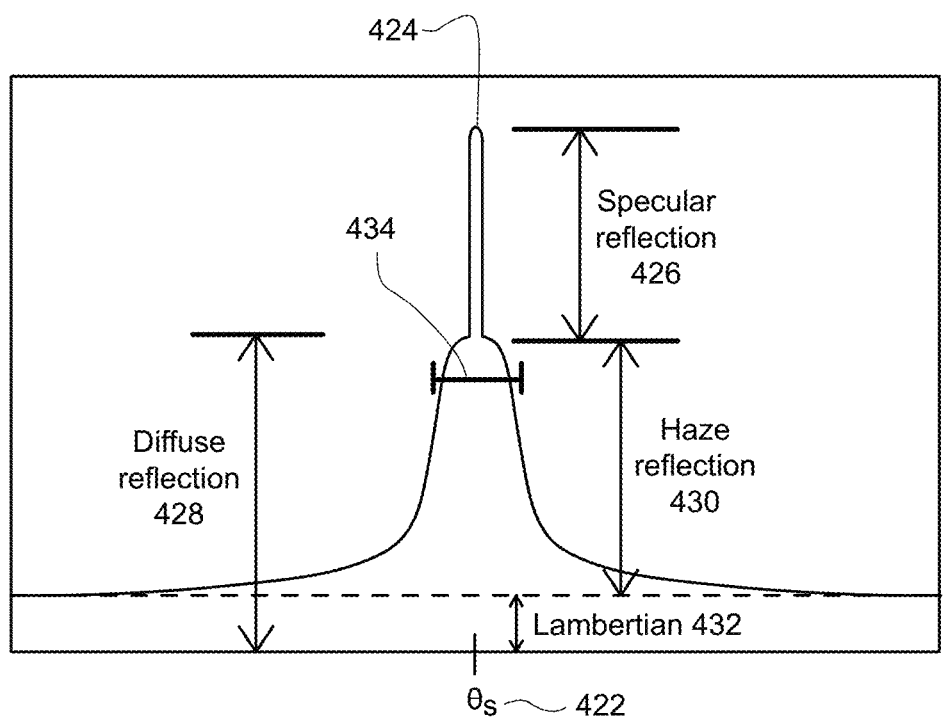

FIG. 4 illustrates a light measurement (FIG. 4A) and a hypothetical display's scatter distribution profile (FIG. 4B) based upon the observation of narrow rays of light from a small source reflecting off the same area of the display. A sharp peak 424 of specular reflection 426 is centered about the specular direction 422, and lies on top of the broad diffuse reflection profile 428. The line 434 may represent the measurement field of an observer 420 and roughly corresponds to the circle 304 shown in FIG. 3.

As also noted above, specular gloss G is the ratio of the light reflected at a specified angle to that incident on the surface at the same angle on the other side of the surface normal. Thus, where I represents incident light and S represents specularly reflected light, G is proportional to S/I. ASTM D523, a popular standard gloss measurement description, contains the core definition of specular gloss units (SGU) which states: a glass of refractive index n=1.567 at 589.3 nm wavelength has a specular gloss value of 100 SGU for any angle of incidence. Then, using n=1.567, to find reflectance $R=(R_s+R_p)/2$ where $$R_s = \left(\frac{\cos\theta - (n^2 - \sin^2\theta)^{1/2}}{\cos\theta + (n^2 - \sin^2\theta)^{1/2}}\right)^2$$

$$R_p = \left(\frac{n^2\cos\theta - (n^2 - \sin^2\theta)^{1/2}}{n^2\cos\theta + (n^2 - \sin^2\theta)^{1/2}}\right)^2$$

the following table is obtained:

| Angle of incidence (degrees) | Reflectance giving 100 SGU (percent) (R) | Factor |
|---|---|---|
| 20 | 4.908 | 20.376 |
| 60 | 10.006 | 9.994 |
| 85 | 61.915 | 1.6151 |

The reflection haze H, is given by the equation $H=G_{60}-G_{20}$, where $G_{60}$ is specular gloss measured with the 60° geometry specified in Test Method D523, and $G_{20}$ is specular gloss measured with the 20° geometry specified in Test Method D523. An example conventional antiglare coating that is commercially available provides a haze percentage ranging from 7.5%-43%, and a 60° glossiness ranging from 18-52.

Figure 5:
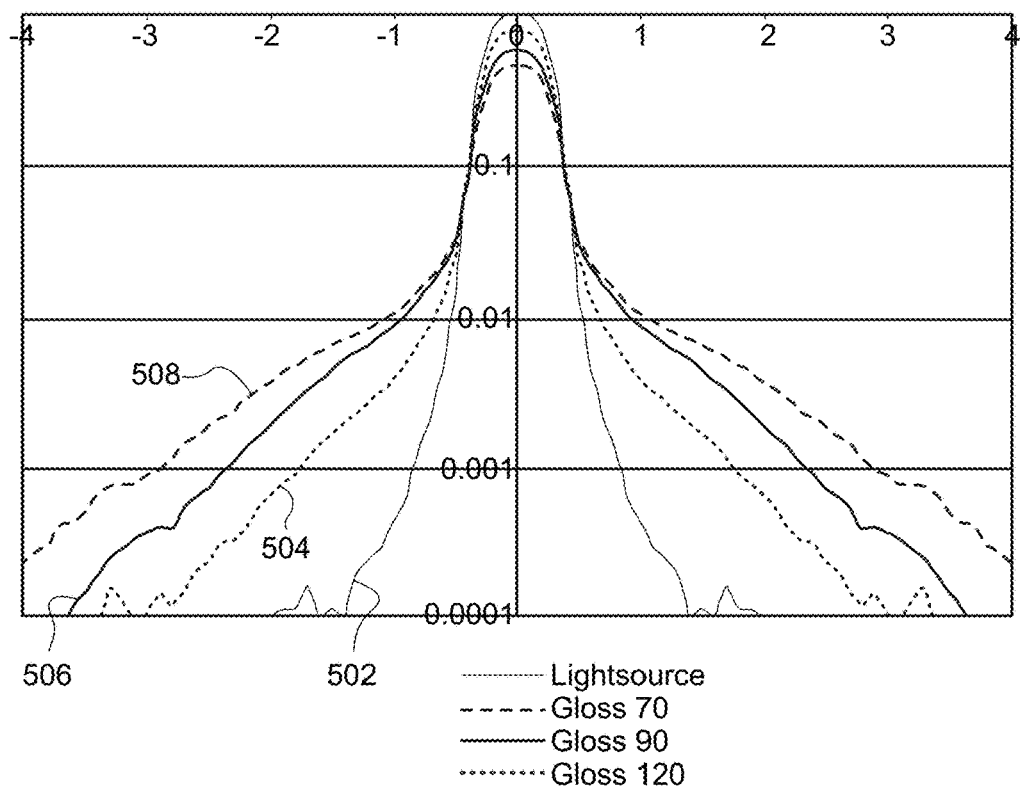
FIG. 5 shows typical in-plane bidirectional transmittance distribution function (BTDF) of AG-treated glass.

FIG. 5 shows typical in-plane bidirectional transmittance distribution function (BTDF) 500 of AG-treated glass with different gloss values (70, 90 and 120). The curve 502 shows the source-receiver signature of the conoscopic measurement system (FWHM=0.55°). Curves 504, 506 and 508 show the respective BTDF for gloss 70, 90 and 120. As shown in the figure, the wider the curve the more incident light gets spread out, and when the spread is greater, the edges of the reflections become less noticeable.

Figure 6:
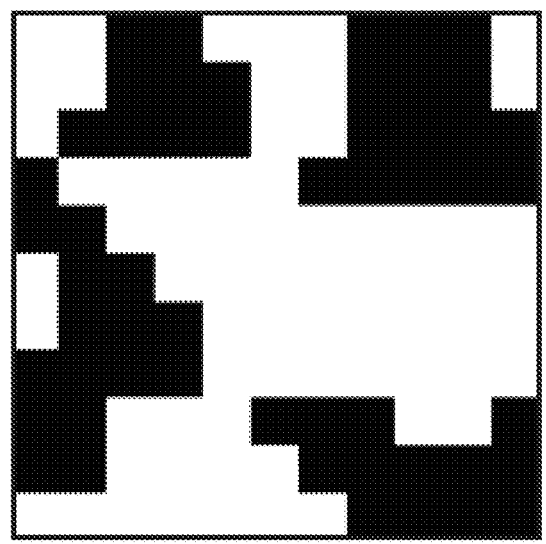
FIG. 6 illustrates an example diffraction pattern used in the antiglare coating according to some example embodiments.

FIG. 6 illustrates an example diffraction pattern 600 used in the antiglare coating according to some example embodiments. Diffraction pattern 600 may be derived using the Inverse Fourier Transform Algorithm. In this example, each whole square is configured to have a side length of 2 microns, but embodiments are not limited thereto. The bright regions represent the top of the grating and the dark regions represent the bottom of the grating.

In an example embodiment, diffraction pattern 600 may be derived using the Gerchberg-Saxton Algorithm where one begins with the desired target intensity and works to find the required phase shift which defines the grating pattern. So, for example, a grating may be created using the pattern 600 being replicated many times to create an array of a photomask. The pattern may be then laid down in photo resist on top of fused silica i.e., the bright regions of the photo resist may be etched away while the dark regions remained. One may then take the glass with the patterned photo resist and place in a reactive ion etching system. The etching system may remove glass in the regions where there is no photo resist to a depth of approximately 0.133 microns. The photo resist may then be stripped and the binary pattern etched in the glass remains. The Gerchberg-Saxton Algorithm is described at https://en.Wikipedia.org/wiki/Gerchbreg%E2%80%93Saxton_algorithm.

Figure 7:
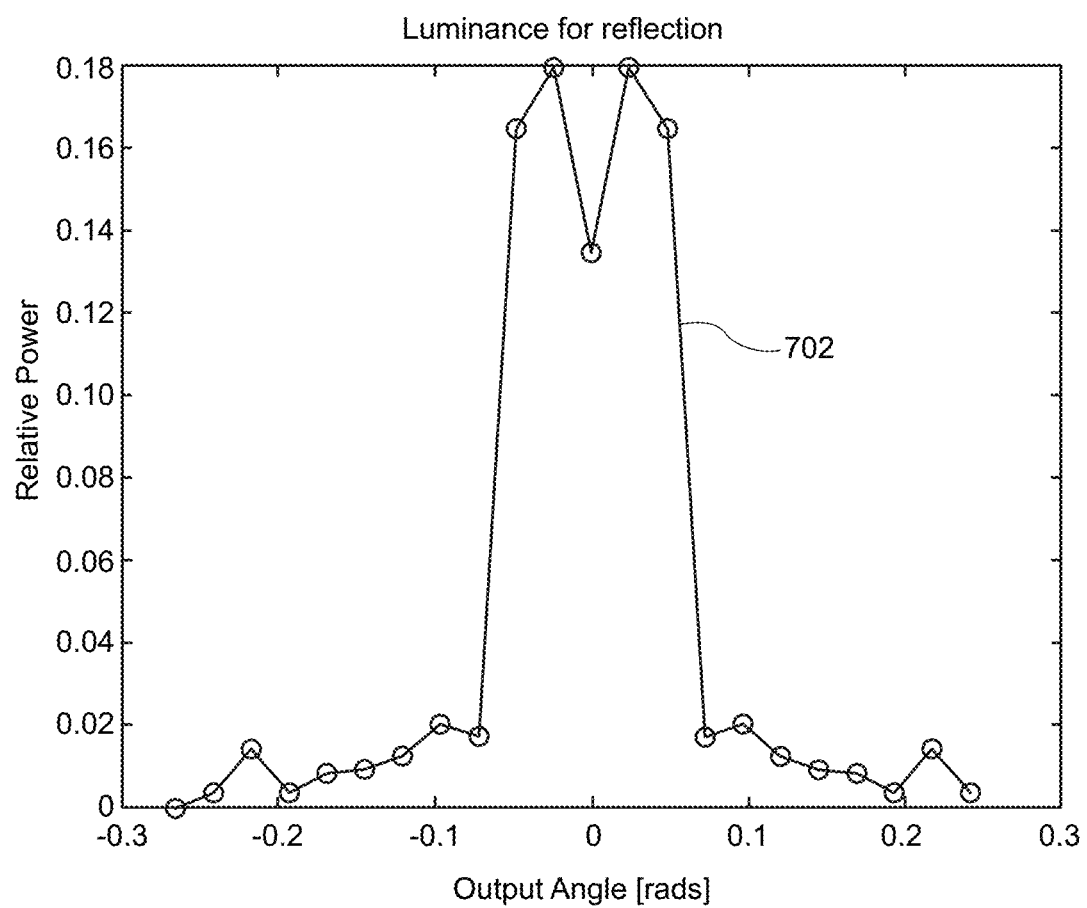
FIG. 7 illustrates a luminance for reflection curve for the diffraction pattern shown in FIG. 6, according to some embodiments.

FIG. 7 illustrates the luminance for reflection curve 702 for the diffraction pattern 600. This can be obtained by taking the Forward Fourier Transform (e.g., the 2D Fourier transform of the complex phase contrast) to simulate the spread in x-direction at 530 nm wavelength. The x-axis and the y-axis represent, respectively, the output angle (in radians) and the relative power. The luminance for reflection curve 702 spreads over a width of 100 milliradians (about 6 degrees, as discussed above in relation to desired design consideration for antiglare coating), as required. This application of the FFT is made clear when considering that the complex phase contrast is $s=li*2*\pi(p/\lambda)$. Then, because the steps in the pattern are quarter wavelength deep, the reflected wave off the bottom step sees twice the step difference (e.g., ¼ down and ¼ up) therefore the reflected path length difference is $p=\lambda/2$. Accordingly, the power in the resulting reflected field is the Fourier transform complex phase contrast.

Figure 8A:
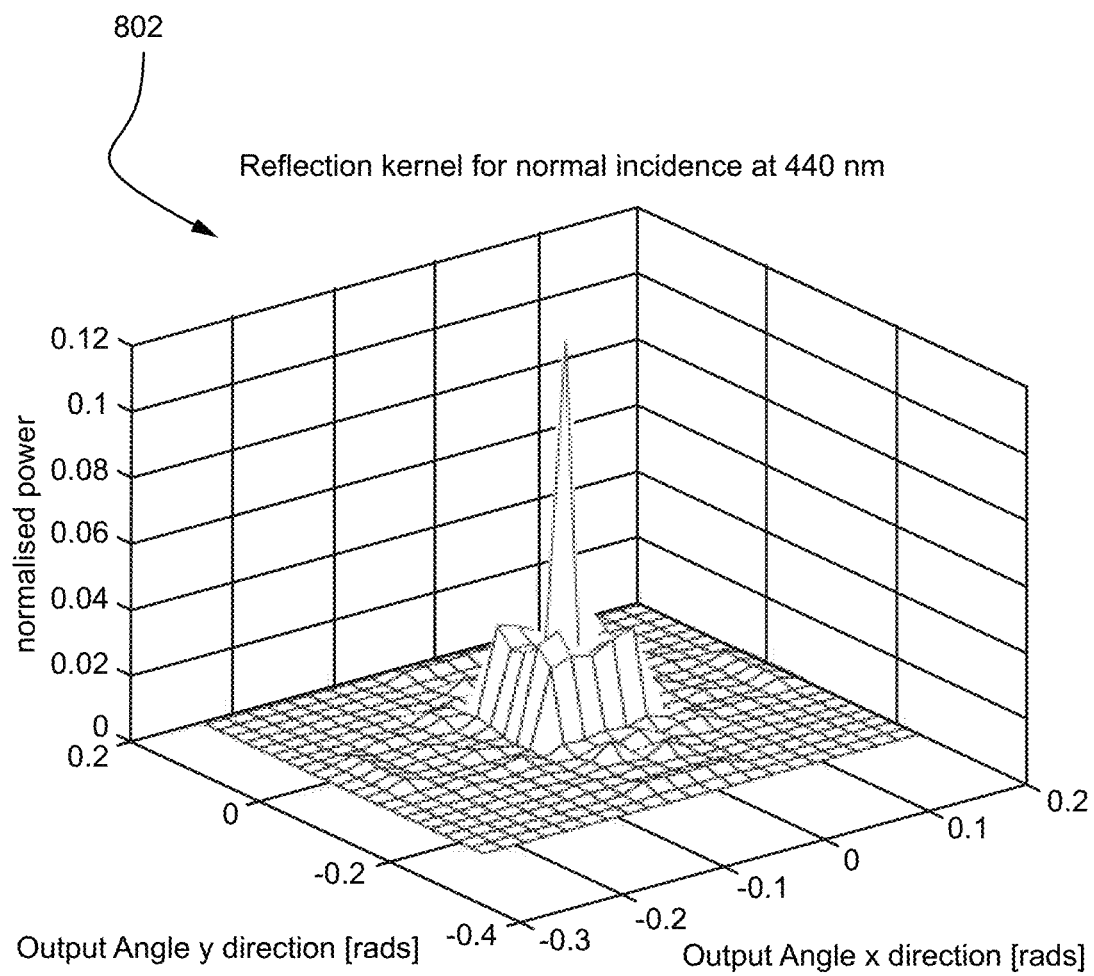
FIG. 8A, FIG. 8B and FIG. 8C (collectively referred to as FIG. 8) illustrate a 2D kernel for representative red 802, green 804 and blue 806 wavelengths of interest.
Figure 8B:
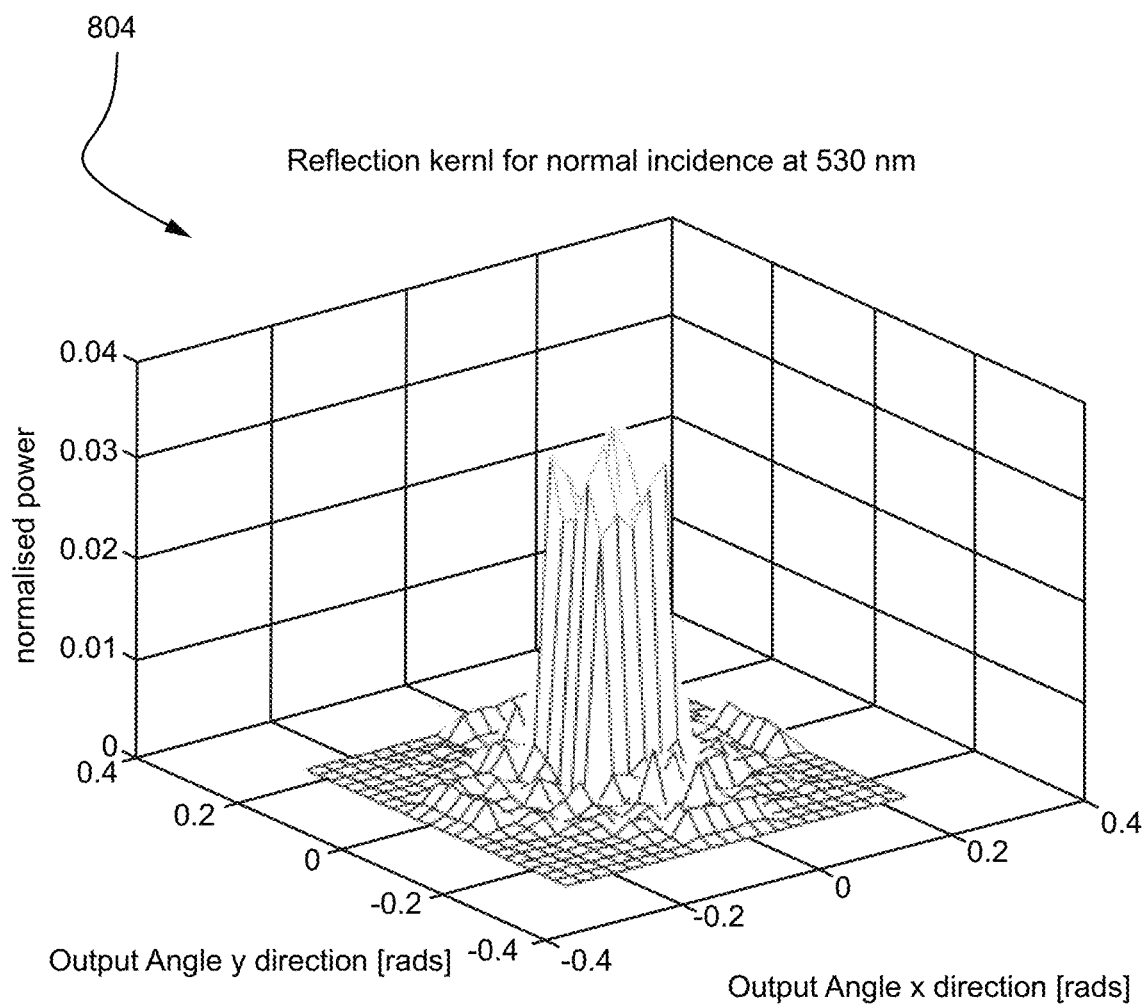
Figure 8C:
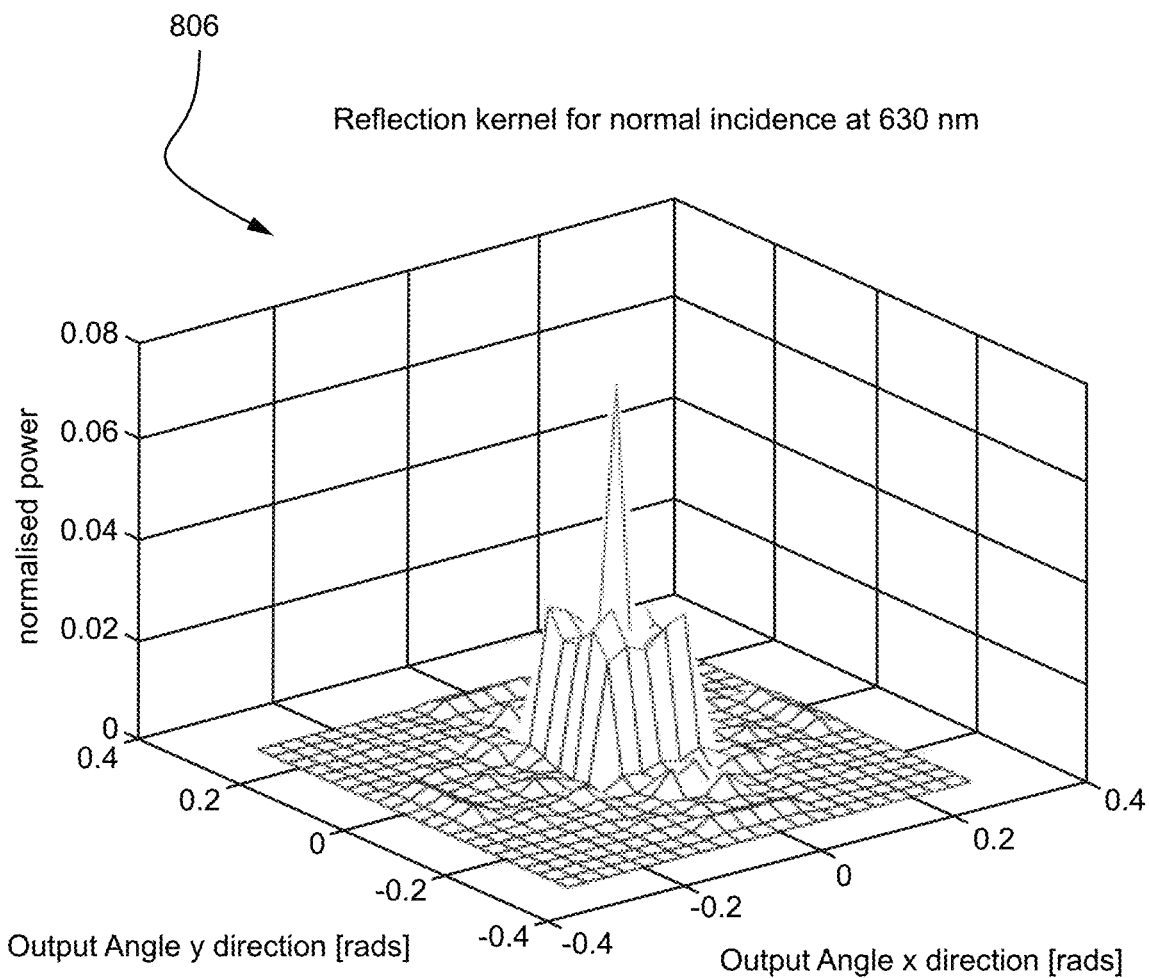

FIG. 8 (FIGS. 8A, 8B and 8C) illustrate a 2D kernel for representative red 802, green 804 and blue 806 wavelengths of interest (in this case the blurry circle referred to above will be square, the same measurements apply). Note that the specular component (the pointed part in the middle of each graph) increases in height relative to the haze component (flat part around the outside of the point) of the kernel for non-optimum wavelengths. The ratio of specular portion to the haze portion—which is proportional to gloss—is plotted in FIG. 9A and FIG. 9B for visible wavelengths. Unity is perfect for reflection values to give good haze, however in the transmission case, it is desirable that this ratio to be as high as possible (e.g., approximately 10:1 for blue light and approximately 20:1 for green light) to prevent back-screen blur.

The proposed antiglare coating, according to some embodiments, has a near perfect specular to haze component ratio for green light, where the bulk of luminance response is situated, however this ratio diminishes for blue light and red light. Backscreen haze is unacceptable for all wavelengths. Example embodiments have a minimum specular to haze ratio of 10:1 in transmission.

Dammann patterns, such as those shown in FIG. 10 (FIGS. 10A-G), are another choice for use as diffraction patterns in embodiments, and may provide a more uniform surface finish when compared to the diffraction pattern of FIG. 6. Dammann patterns produce relatively uniform power across the first 5 and 7 diffraction orders respectively. These diffraction patterns can be thought of as image filter kernels that act on he reflected image. It is important to get uniform filter kernels, as otherwise the effect may include the making of widely spaced copies of the image. The 1×5 and 1×7 patterns, shown in FIG. 10D and FIG. 10F, respectively, may be most suitable for use as diffraction patterns in some embodiments. As illustrated in FIG. 10, the patterns are made using 1 micron fracturing. The specular to haze ratios are similar to those above.

Etching a diffraction pattern that includes stepping in a coating over the surface of the top display in a multi-layered display can be done by any one of several processes, mechanical, chemical or depositions. Chemical or deposition processes are most commonly used for displays. In the chemical process, the glass or plastic overlay to be applied to the display is patterned with photo-resist and then etched with a solvent such as buffered hydrofluoric acid for glass or an organic solvent for plastic. This removes material in regions where the photo resist is absent in such a manner as to leave a stepped surface. Deposition processes involve spray or dip coating the overlay with a solution which, on drying, will leave a patterned layer of a different height behind.

In one embodiment, the antiglare layer according may be a 3 mm Acrylic+SU8 layer with the SU8 spun to 0.133 um thickness. In another embodiment, the antiglare layer is an RIE etched glass with Poly10 spun to a nominal thickness. In another embodiment, acid etched glass is used for the antiglare coating. With ordinary microelectronic-lithography technology, mask patterns can easily be transferred with Photoresist AZ1450 onto pieces of glass. A wet-chemical-etching process may be used. The etching solution may be a carefully diluted HF solution, in which a certain amount of the chemical NH4F is added to balance the etching speed. The etching temperature may be controlled to about 140° C. The etching time may also controlled we use several minutes. Another type of antiglare coating that may be used in embodiments is plastic film/plate in which a master may be created by etching/spin coating and sub-mastered to nickel.

FIG. 11 illustrates a table 1100 with three diffraction patterns 1102, 1104 and 1106 that can be used in example embodiments of the present disclosure, and their associated performance. Diffraction pattern 1102 provides 11, 64, 53 for 20° gloss, 60° gloss and haze, respectively. Diffraction pattern 1104 provides 5.9, 58, 52, and diffraction pattern provides 1106 6.3, 59, 53 for their respective 20° gloss, 60° gloss and haze measurements.

Figure 12:
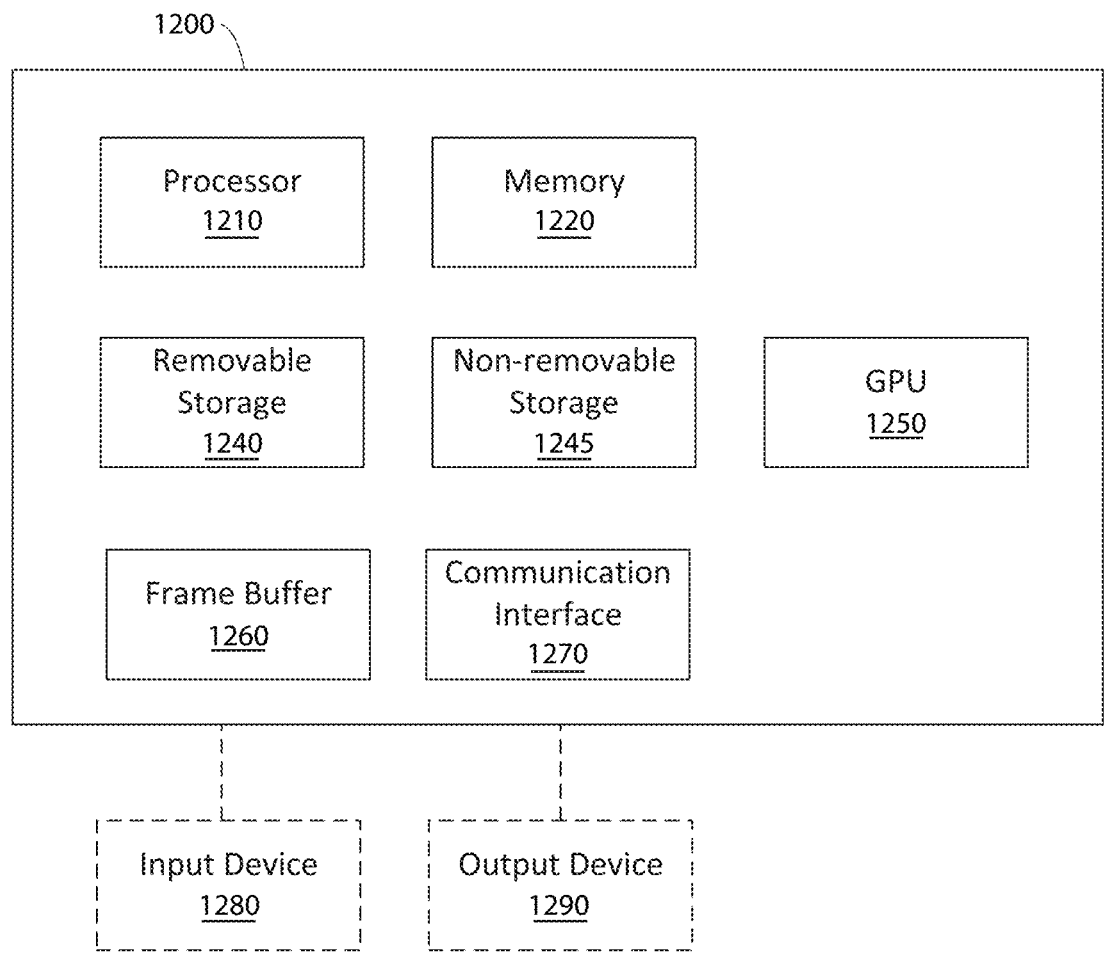
FIG. 12 illustrates an exemplary processing system that may be used in associated with a multi-layered display in certain example embodiments.

FIG. 12 illustrates an exemplary processing system 1200 that may used in the multi-layered displays according to embodiments. The processing system 1200 may include one or more processors 1210 and memory 1220. The processor 1210 may comprise a central processing unit (CPU) or other type of processor. Depending on the configuration and/or type of computer system environment, the memory 720 may comprise volatile memory (e.g., RAM), non-volatile memory (e.g., ROM, flash memory, etc.), or some combination of the two. Additionally, memory 1220 may be removable, non-removable, etc.

In other embodiments, the processing system may comprise additional storage (e.g., removable storage 1240, non-removable storage 1245, etc.). Removable storage 1240 and/or non-removable storage 1245 may comprise volatile memory, non-volatile memory, or any combination thereof. Additionally, removable storage 1240 and/or non-removable storage 1245 may comprise CD-ROM, digital versatile disks (DVD) or other optical storage, magnetic cassettes, magnetic tape, magnetic disk storage or other magnetic storage devices, or any other medium which can be used to store information for access by processing system 1200.

As illustrated in FIG. 12, the processing system 1200 may communicate with other systems, components, or devices via communication interface 1270. Communication interface 1270 may embody computer readable instructions, data structures, program modules or other data in a modulated data signal (e.g., a carrier wave) or other transport mechanism. By way of example, communication interface 1270 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 1270 may also couple the processing system 1200 to one or more input devices 1280 (e.g., a keyboard, mouse, pen, voice input device, touch input device, etc.) and/or output devices 1290 (e.g., a display, speaker, printer, etc.). The input devices 1290 may be used by an observer to manipulate the way information is displayed on an output device 1290 and/or what information and/or graphics are displayed in different portion of the output device 1290. In one embodiment, communication interface 1270 may couple the processing system 1200 to a display including two or more display panels arranged in an overlapping manner.

As shown in FIG. 12, a graphics processor 1250 may perform graphics/image processing operations on data stored in a frame buffer 1260 or another memory of the processing system. Data stored in frame buffer 1260 may be accessed, processed, and/or modified by components (e.g., graphics processor 1250, processor 1210, etc.) of the processing system 1200 and/or components of other systems/devices. Additionally, the data may be accessed (e.g., by graphics processor 450) and displayed on an output device coupled to the processing system 1200. Accordingly, memory 1220, removable storage 1240, non-removable storage 1245, frame buffer 1260, or a combination thereof, may comprise instructions that when executed on a processor (e.g., 1210, 1250, etc.) implement a method of processing data (e.g., stored in frame buffer 1260) for improved reliability and/or display quality on a display such as, for example, a process described above of displaying an image in the multi-layered display by displaying different parts of that image in respective screens of the multi-layered display.

As shown in FIG. 12, portions of certain example embodiments of the present invention may be comprised of computer-readable and computer-executable instructions that reside, for example, in a processing system 1200 and which may be used as a part of a general purpose computer network (not shown). It is appreciated that processing system 1200 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

In some example embodiments of this invention, there is provided a multi-layered display, comprising an upper display screen, a lower display screen arranged so as to at least partially overlap with the upper display screen, and an antiglare layer disposed on the upper display screen, the antiglare layer comprising a diffraction pattern configured to blur ambient reflections without substantially affecting transmitted light.

In the multi-layered display of the immediately preceding paragraph, the diffraction pattern may have a quarter wavelength thickness.

In the multi-layered display according to any of the immediately preceding two paragraphs, the diffraction pattern may provide a reflection scattering of full width half maximum (FWHM) of at least 6 degrees.

In the multi-layered display according to any of the immediately preceding three paragraphs, the antiglare layer may provide a hardness of at least M-94 on the Rockwell Hardness scale.

In the multi-layered display according to any of the immediately preceding four paragraphs, the diffraction pattern may impose a top surface and a bottom surface in a grating such that equal portions of incident light would contact the top surface and the bottom surface.

In the multi-layered display according to any of the immediately preceding six paragraphs, a path of the transmitted light may change only due to a refractive index of the antiglare layer.

The multi-layered display according to any of the immediately preceding seven paragraphs, may further comprise one or more other display screens between the lower display screen and the upper display screen.

In the multi-layered display according to any of the immediately preceding eight paragraphs, the transmitted light may include respective images displayed on the lower display screen and said one or more other display screens.

The multi-layered display according to any of the immediately preceding nine paragraphs, may further comprise a lighting source that is controllable to illuminate one or more of the other display screens, the upper display screen or the lower display screen.

In the multi-layered display according to any of the immediately preceding ten paragraphs, the upper display screen and the lower display screen may include an LED-based display.

In the multi-layered display according to any of the immediately preceding eleven paragraphs, the upper display screen and the lower display screen may include an LCD-based display.

In some example embodiments of this invention, there is provided a method of forming a multi-layered display. The method comprises: providing an upper display screen; providing a lower display screen arranged so as to at least partially overlap with the upper display screen; and disposing an antiglare layer on the upper display screen, the antiglare layer comprising a diffraction pattern configured to blur ambient reflections without substantially affecting transmitted light.

In the method of the immediately preceding paragraph, the diffraction pattern may have a quarter wavelength thickness.

In the method of the immediately preceding two paragraphs, the diffraction pattern may provide a reflection scattering of full width half maximum (FWHM) of at least 6 degrees.

In the method of the immediately preceding three paragraphs, the antiglare layer may be configured to a hardness of at least M-94 on the Rockwell Hardness scale.

In the method of the immediately preceding four paragraphs, the diffraction pattern may impose a top surface and a bottom surface in a grating such that equal portions of incident light would contact the top surface and the bottom surface.

In the method of the immediately preceding five paragraphs, a path of the transmitted light may change only due to a refractive index of the antiglare layer.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

The invention claimed is:

1. A multi-layered display, comprising:
an upper display screen;
a lower display screen arranged so as to at least partially overlap with the upper display screen; and
an antiglare layer disposed on the upper display screen so as to be an outermost layer, the antiglare layer comprising a diffraction pattern configured to blur ambient reflections without substantially affecting transmitted light and to provide a reflective specular/haze ratio of about one at a wavelength of 0.55 µm in order to reduce back-screen blur.

2. A multi-layered display according to claim 1, wherein the diffraction pattern has a quarter wavelength thickness.

3. A multi-layer display according to claim 2, wherein the diffraction pattern imposes a top surface and a bottom surface in a grating such that equal portions of incident light would contact the top surface and the bottom surface.

4. A multi-layer display according to claim 2, wherein a path of the transmitted light changes only due to a refractive index of the antiglare layer.

5. A multi-layered display according to claim 1, wherein diffraction pattern provides a reflection scattering of full width half maximum (FWHM) of at least 6 degrees.

6. A multi-layer display according to claim 5, wherein the antiglare layer provides a hardness of at least M-94 on the Rockwell Hardness scale.

7. A multi-layer display according to claim 1, further comprising one or more other display screens between the lower display screen and the upper display screen.

8. A multi-layer display according to claim 7, wherein the transmitted light includes respective images displayed on the lower display screen and said one or more other display screens.

9. A multi-layer display according to claim 7, further comprising a lighting source that is controllable to illuminate one or more of the other display screens, the upper display screen or the lower display screen.

10. A multi-layer display according to claim 1, wherein the upper display screen and the lower display screen include one or more LED-based displays.

11. A multi-layer display according to claim 1, wherein the upper display screen and the lower display screen include one or more LCD-based displays.

12. A method of forming a multi-layered display, comprising:
providing an upper display screen;
providing a lower display screen arranged so as to at least partially overlap with the upper display screen; and
disposing an antiglare layer on the upper display screen so as to be an outermost layer, the antiglare layer comprising a diffraction pattern configured to blur ambient reflections without substantially affecting transmitted light and to provide a reflective specular/haze ratio of about one at a wavelength of 0.55 µm.

13. A method according to claim 12, wherein the diffraction pattern has a quarter wavelength thickness.

14. A method according to claim 13, wherein the diffraction pattern provides a reflection scattering of full width half maximum (FWHM) of at least 6 degrees.

15. A method according to claim 14, wherein the antiglare layer is configured to a hardness of at least M-94 on the Rockwell Hardness scale.

16. A method according to claim 13, wherein the diffraction pattern imposes a top surface and a bottom surface in a grating such that equal portions of incident light would contact the top surface and the bottom surface.

17. A method according to claim 13, wherein a path of the transmitted light changes only due to a refractive index of the antiglare layer.

* * * * *